(12) United States Patent
Fornage

(10) Patent No.: US 9,748,769 B2
(45) Date of Patent: Aug. 29, 2017

(54) SERIALLY CONNECTED MICRO-INVERTER SYSTEM HAVING CONCERTINA OUTPUT VOLTAGE CONTROL

(71) Applicant: Enphase Energy, Inc., Petaluma, CA (US)

(72) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 710 days.

(21) Appl. No.: 14/032,808

(22) Filed: Sep. 20, 2013

(65) Prior Publication Data

US 2014/0084695 A1    Mar. 27, 2014

Related U.S. Application Data

(60) Provisional application No. 61/703,864, filed on Sep. 21, 2012.

(51) Int. Cl.
*H02J 3/00* (2006.01)
*H02J 3/16* (2006.01)
(Continued)

(52) U.S. Cl.
CPC ............ *H02J 3/00* (2013.01); *H02H 3/16* (2013.01); *H02H 3/20* (2013.01); *H02H 3/207* (2013.01);
(Continued)

(58) Field of Classification Search
USPC .......................................................... 307/82
See application file for complete search history.

(56) References Cited

U.S. PATENT DOCUMENTS 7,233,113 B2 * 6/2007 Ongaro ............. H05B 41/3922
                                                       315/219
7,986,539 B2 * 7/2011 Fornage ................ G05F 1/67
                                                       307/140
(Continued)

FOREIGN PATENT DOCUMENTS

JP          2012-080666 A    4/2012
KR          10-1111551 B1    2/2012

OTHER PUBLICATIONS

International Search Report and Written Opinion mailed Dec. 26, 2013 for Application No. PCT/US2013/061187, 15 pgs.

*Primary Examiner* — Rexford Barnie
*Assistant Examiner* — Xuan Ly
(74) *Attorney, Agent, or Firm* — Moser Taboada

(57) ABSTRACT

The present invention is directed towards a serially connected micro-inverter (SCMI) system comprising a plurality of power sources for producing DC power, a plurality of micro-inverters, where each micro-inverter is coupled to at least one power source of the plurality of power sources, for converting the DC power into AC power, an AC bus for coupling the plurality of micro-inverters in series to form a string and for coupling the AC power an AC line; and a controller, coupled to the string, for measuring an output signal of one or more strings of series coupled micro-inverters, comparing the measured output signal to a desired signal for the string; and adjusting a phase angle of an output from each micro-inverter in the one or more strings until a difference between the measured output signal and the desired signal is less than a predetermined threshold value.

17 Claims, 7 Drawing Sheets

(51) Int. Cl.
- *H02J 3/38* (2006.01)
- *H02H 3/16* (2006.01)
- *H02H 3/20* (2006.01)
- *H02H 3/24* (2006.01)

(52) U.S. Cl.
CPC .............. *H02H 3/24* (2013.01); *H02J 3/16* (2013.01); *H02J 3/385* (2013.01); *Y02E 10/58* (2013.01); *Y02E 40/34* (2013.01); *Y10T 307/707* (2015.04)

(56) References Cited

U.S. PATENT DOCUMENTS

| | | | |
|---|---|---|---|
| 2009/0079383 A1* | 3/2009 | Fornage | G05F 1/67 320/101 |
| 2009/0261655 A1* | 10/2009 | Kernahan | H01L 31/02021 307/77 |
| 2009/0279221 A1* | 11/2009 | Coloma Calahorra | H02H 7/20 361/84 |
| 2012/0091817 A1* | 4/2012 | Seymour | H02J 3/383 307/82 |
| 2012/0175964 A1* | 7/2012 | Yoscovich | H02J 3/383 307/82 |
| 2012/0255591 A1 | 10/2012 | Arditi et al. | |

\* cited by examiner

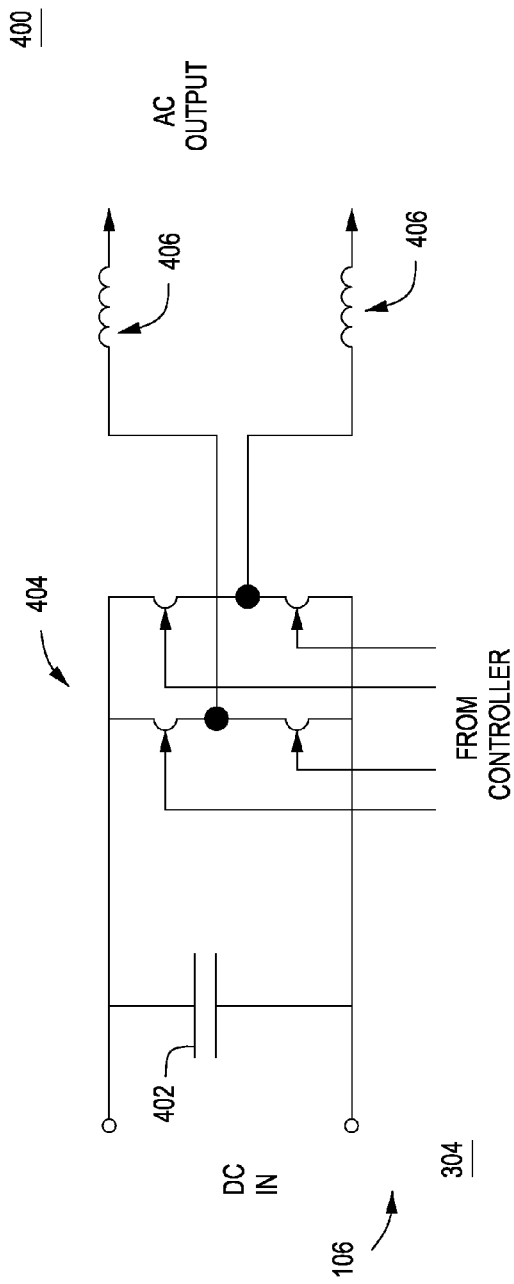
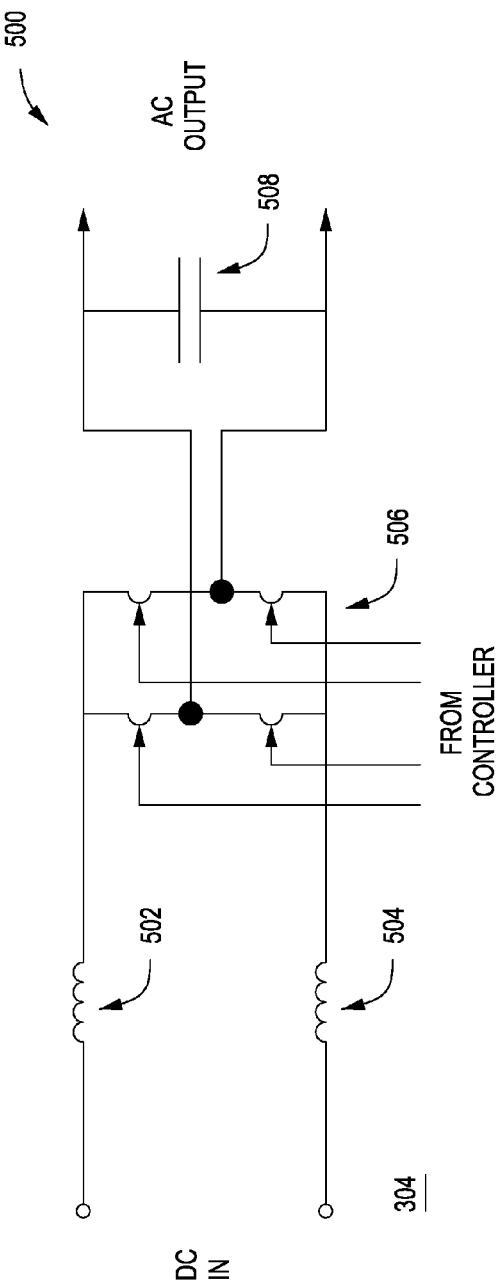

SERIALLY CONNECTED MICRO-INVERTER SYSTEM HAVING CONCERTINA OUTPUT VOLTAGE CONTROL

CROSS-REFERENCE TO RELATED APPLICATION

This application claims priority to U.S. Provisional Patent Application No. 61/703,864 filed on Sep. 21, 2012, which is incorporated by reference herein in its entirety.

BACKGROUND OF THE INVENTION

Field of the Invention

Embodiments of the present invention generally relate to distributed power systems and, more particularly, to a serially connected micro-inverter system having concertina output voltage control.

Description of the Related Art

Distributed power systems comprise a power source that generates direct current (DC) power, a power converter, and a controller. The power source may be a solar panel or solar panel array, a wind turbine or a wind turbine array, a hydroelectric generator, fuel cell, and the like. The power converter converts the DC power into alternating current (AC) power, which is coupled directly to the AC power grid. The controller ensures that the power conversion process operates as efficiently as possible.

One type of power converter is known as a micro-inverter. Micro-inverters typically convert DC power to AC power at the power source. Thus, each power source is coupled to a micro-inverter. A plurality of AC power outputs from the micro-inverters are coupled in parallel to the AC power grid. Since the outputs of each micro-inverter are coupled in parallel directly to the AC power grid, all the parallel connected micro-inverters are simply synchronized to the AC power grid.

Because of the parallel connected nature of a parallel connected micro-inverter system, the output voltages are substantial, e.g., hundreds of volts. Consequently, the inverters are typically buck-boost type inverters with an H-bridge output circuit that require a transformer to generate the high-voltage and switching transistors to handle the high-voltage within the H-bridge. The transformer and high-voltage transistors add significant cost to the manufacturing cost of a micro-inverter.

Therefore, there is a need in the art distributed power system that does not require transformers and high-voltage transistors.

SUMMARY OF THE INVENTION

A serially connected micro-inverter system having concertina output voltage control substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 depicts a schematic diagram of a voltage source inverter (VSI) that can be used within the SCMI system of FIG. 1;

FIG. 5 depicts a schematic diagram of a current source inverter (CSI) that can be used within the SCMI system of FIG. 1;

DETAILED DESCRIPTION

Figure 1:
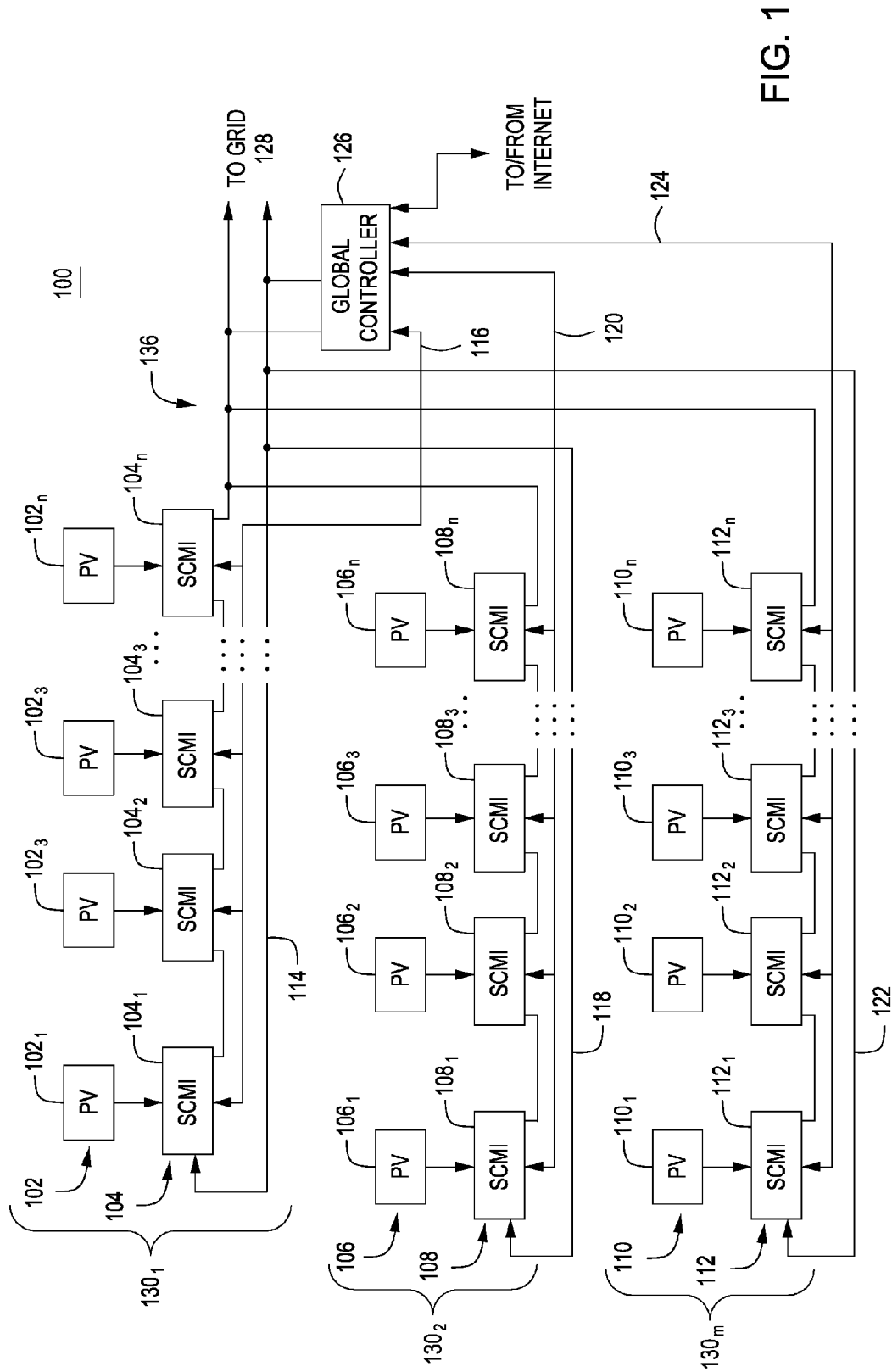
FIG. 1 depicts a block diagram of a serially connected micro-inverter (SCMI) system in accordance with various embodiments of the invention.

FIG. 1 depicts a block diagram of a serially connected micro-inverter (SCMI) system 100 in accordance with various embodiments of the invention. The system 100 comprises a plurality of power sources (e.g., photovoltaic (PV) modules) $102_1, 102_2, 102_3, \ldots, 102_n$ (collectively referred to as 102), a plurality of SCMI $102_1, 104_2, 104_3, \ldots, 104_n$ (collectively referred to as 104), and a global controller 126. Each power source 102 is connected to an associated SCMI 104 and a plurality of the SCMIs 104 are connected in series with one another via an AC bus 114 to form a "string" $130_1$. A plurality of strings $130_1, 130_2 \ldots 130_m$ may be coupled in parallel to form an array of strings. String $130_2$ comprises PV modules 106, SCMI 108 and an AC bus 118, while string $130_m$ comprises PV modules 110, SCMI 112, and an AC bus 122.

The global controller 126 is coupled to a location on the AC buses 114, 118, 122 where the buses are coupled together. From this coupling junction 136, the global controller 126 can sample the output voltage and the output current. The global controller 126 is coupled to a plurality of control buses 116, 120 and 124. These control buses couple control signals from the global controller 126 to each of the SCM I 104, 108 and 112. Consequently, the global controller 126 controls many aspects and functions of the SCMI as described in detail with reference to FIG. 6.

Although FIG. 1 depicts photovoltaic modules as the power sources, other power sources, e.g., wind turbines, a hydroelectric generators, fuel cells, and the like may also be utilized. Furthermore, the depicted embodiment shows three strings, each comprising four SCMI. The variables n and m represent that any number of SCMI and strings may be used to form an n by m array of power generators (PV modules and SCMI combinations).

Figure 2:
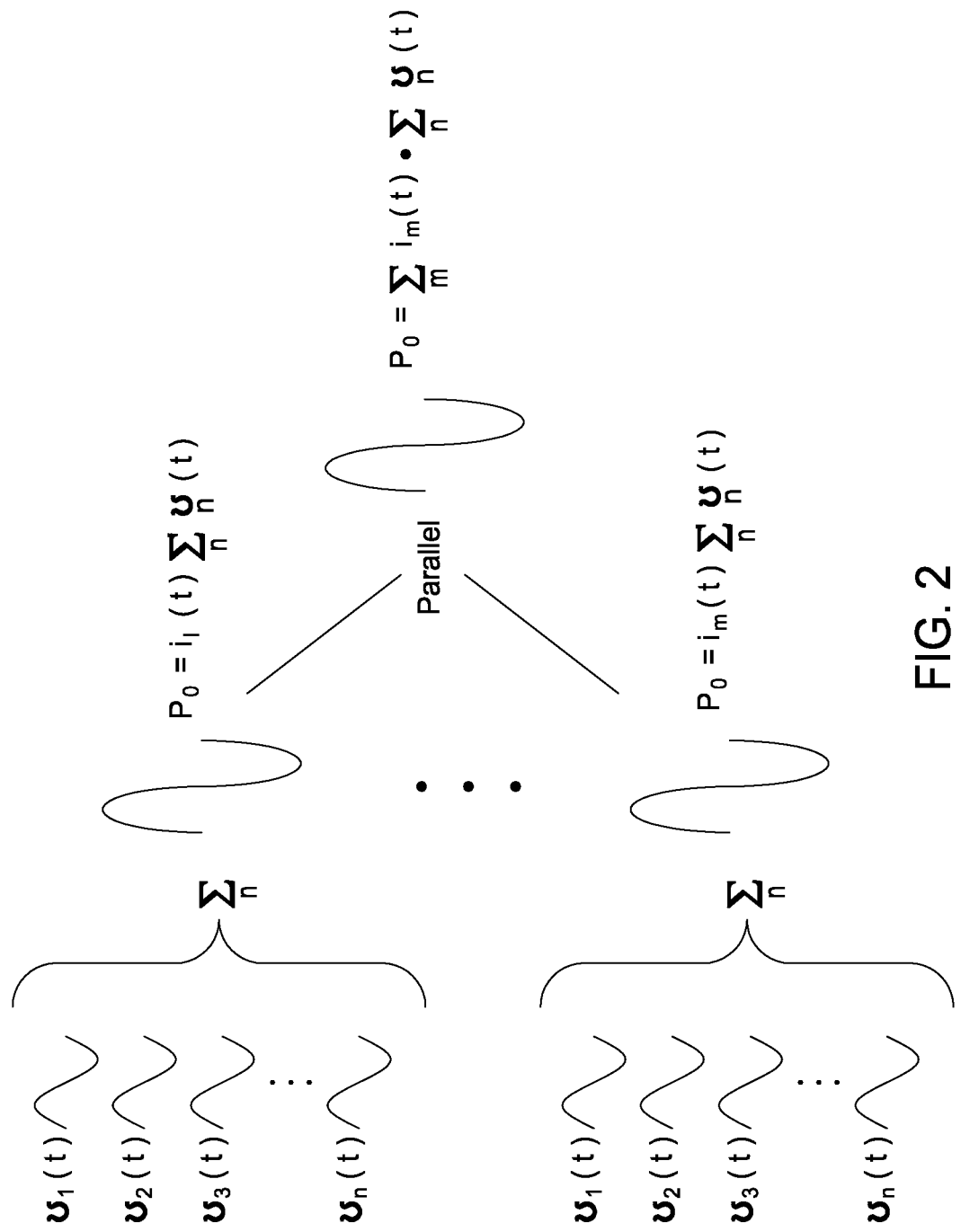
FIG. 2 illustrates the power combination that occurs within an SCMI system of FIG. 1.

FIG. 2 illustrates the power combination that occurs in the SCMI system 100 of FIG. 1. Each SCMI generates $v_n(t)$ and i(t) on the AC bus—the voltage waveforms are shown for a single cycle of AC power generated by an SCMI. Because the SCMI are serially connected, the current through each SCMI within a string is the same, although the current value of the string may vary over time with environmental conditions. The voltage $v_n(t)$ produced by each SCMI varies with the illumination intensity incident upon the PV module, i.e., more sunlight produces a higher output voltage. To produce a maximum power output for a given sunlight irradiance, the SCMIs generally utilize a maximum power point tracking (MPPT) technique as is described below with reference to FIG. 3.

The serial connection of the SCMI result in a summation of the voltage (and power) produced by each SCMI. As such, the power generated by a string is represented by:

$$P(t) = i_m(t) \bullet \sum_n v_n(t)$$

where:
P(t) is the power generated by a given string;
$I_m(t)$ is the current in a given string; and
$V_n(t)$ is the voltage produced by each SCMI.

Thus, a string of SCMIs, the summed voltage equals the desired AC grid voltage, e.g., a 240 volt grid voltage may use 12, 20 volt SCMIs. Each of the strings are connected in parallel to produce an output power represented by the equation:

$$P_0(t) = \sum_m \left( i_m(t) \cdot \sum_n v_n(t) \right)$$

where:
$P_o(t)$ is the power generated by the SCMI system;
$I_m(t)$ is the current in a given string; and
$V_n(t)$ is the voltage produced by each SCMI.

Figure 3:
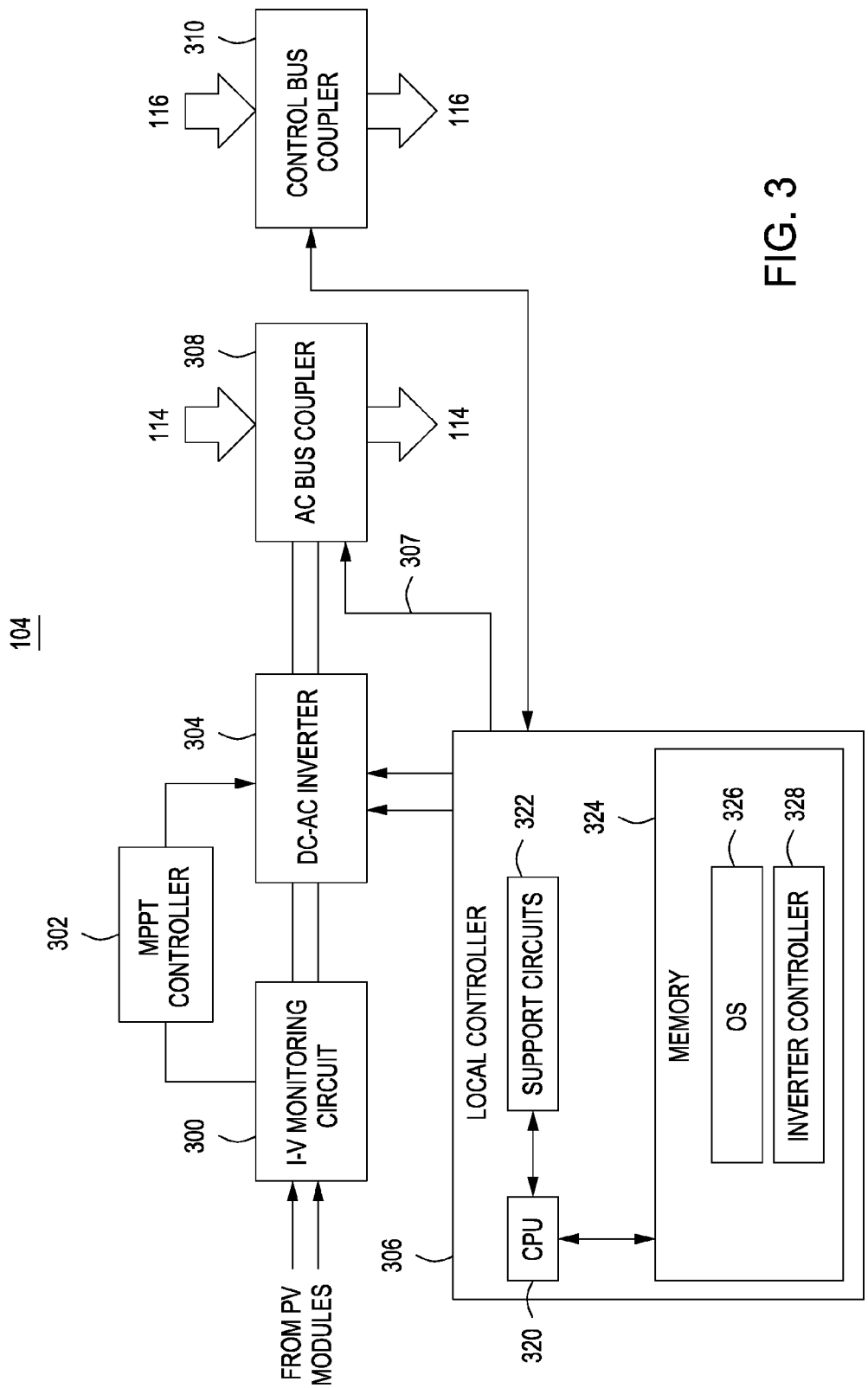
FIG. 3 is a block diagram of an SCMI that can be used within the SCMI system of FIG. 1.

FIG. 3 depicts a block diagram of an SCMI 104 that may be used in the SCMI system 100 of FIG. 1. The SCMI 104 comprises a current-voltage (I-V) monitoring circuit 300, an MPPT controller 302, a DC-AC inverter 304, a controller 306, an AC bus coupler 308 and a control bus coupler 310.

The I-V monitoring circuit 300 monitors the instantaneous voltage and current output levels, $V_p$, and $I_{pv}$, respectively, from the PV module 104, and provides a signal indicative of such current and voltage information to the MPPT controller 302. The I-V monitoring circuit 300 couples DC power to the DC-AC inverter 304. The MPPT controller 302 is coupled to the DC-AC inverter 304 and controls the voltage across the PV module 104 to ensure that the maximum power point is maintained. Various well-known algorithms and techniques are available for use by the MPPT controller 302 to maintain the maximum power point.

The DC-AC inverter 304 converts the DC power from the PV module 102 into AC power. The inverter 304 operates at a relatively low voltage, e.g., 20-50 volts DC. An inverter that operates at such a low voltage does not require a transformer or high-voltage transistors. FIGS. 4 and 5 below depict typical configurations for low voltage inverters. The AC output of the DC-AC inverter 304 is coupled to the AC bus coupler 308. The AC bus coupler 308 is coupled to the AC bus 114 and serially couples AC output power to the AC bus 114.

The local controller 306 controls operation of the DC-AC inverter 304. The local controller 306 comprises a CPU 320, support circuits 322 and memory 324. The memory 324 comprises an operating system 326, such as an embedded operating system, and an inverter controller 328 for controlling the DC-AC inverter 304. The support circuits 322 are coupled to the memory 324 via the CPU 320. Specifically, the inverter controller 328 of the local controller 306 ensures that the AC output of the inverter 304 is in phase with the AC grid voltage. Additionally, the local controller 306 can monitor and report operation and functional information to the control bus coupler 310. In addition, the local controller 306 provides a bypass control signal 307 to the AC bus coupler 308. The bypass control signal 307 controls a plurality of switches within the AC bus coupler 308 that disconnects the inverter 304 from the AC bus 114 and creates a short circuit on the bus 114. As such, a faulty SCMI can be disconnected from the bus 114 while still allowing the string of remaining SCMIs to operate.

FIGS. 4 and 5 each depict a schematic diagram of a different type of inverter circuit that can be used as inverter 304 in FIG. 3. FIG. 4 depicts a schematic of a voltage source inverter (VSI) 400 having a input capacitor 402 and H-bridge 404 and output inductors 406. In short, the applied DC voltage is pulsed from the input to the output using the H-bridge 404 to create positive and negative pulses synchronize with the AC grid voltage. FIG. 5 depicts a schematic of a current source inverter (CSI) 500 that is the dual of a VSI and operates in a similar manner as the VSI to produce an AC waveform from a DC input. The CSI 500 comprises inductors 502 and 504 coupled to an H-bridge 506. The output of the H-bridge 506 is coupled to an output capacitor 508 to create a pulsed AC current signal synchronized with the AC grid voltage.

Figure 6:
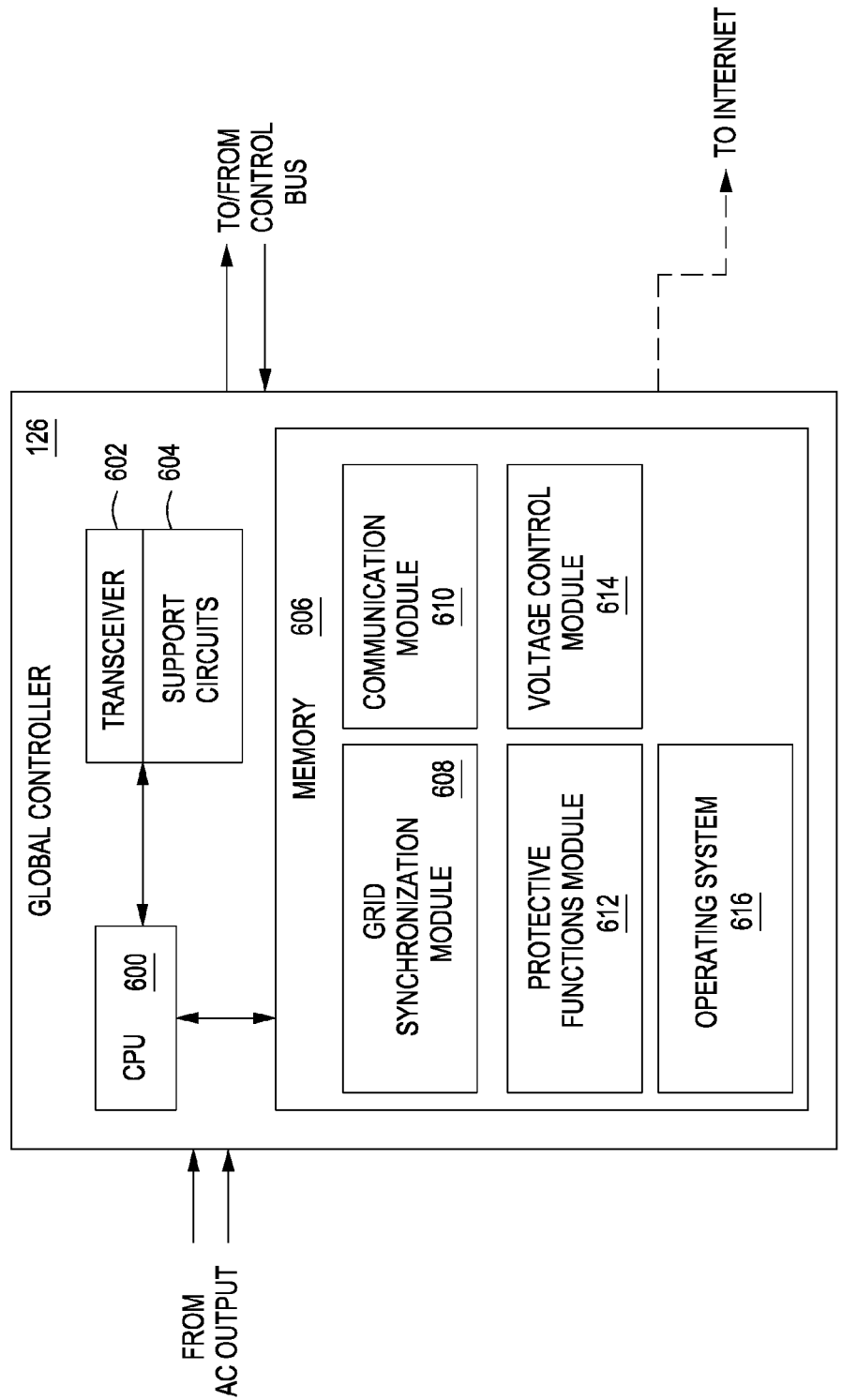
FIG. 6 depicts a block diagram of a controller that can be used within the SCMI system of FIG. 1.

FIG. 6 depicts a block diagram of a global controller 126 of FIG. 1. The global controller 126 comprises a central processing unit (CPU) 600, transceiver 602, support circuits 604, and memory 606. The CPU 600 may be any commercially available processor, microprocessor, microcontroller, and the like. The support circuits 604 are coupled to the memory 606 via the CPU 600 and vice-versa. The transceiver 602 communicates with the SCMI 104, for example, via wired or wireless communications. In one embodiment, the communications channel is formed via the control bus coupler 310 shown in FIG. 3. In other embodiments, the communications channel may be formed via WiFi (e.g., 802.11 standard communications techniques). The support circuits comprise well known circuits that provide functionality to the CPU such as clock circuits, cache, power supplies, I/O circuits, and the like.

The memory 606 may be any form of digital storage used for storing data and executable software. Such memory includes random access memory, read only memory, disk storage, optical storage, and the like. The memory 606 stores a grid synchronization module 608, a communications module 610, a protective functions module 612 and a voltage control module 614. According to some embodiments, an operating system 616 is stored in the memory 606 of the controller 126.

The grid synchronization module 608 digitizes the voltage at the AC output and generates synchronization signals for the SCMIs. The grid synchronization module 608 addresses the synchronization signals to each individual SCMI, where a local controller, such as the local controller 306 shown in FIG. 3, produces the appropriate switching signals for the H-bridge to generate an AC waveform that is synchronized with the AC grid voltage.

The communications module 610 generates the appropriate data structures and signaling for the channel to be used in communicating with the SCMIs. In some embodiments, the communications module formats data for communication via the Internet to a remote monitoring station. The information may be communicated from the SCMIs regarding SCMI functionality, efficiency, up time, irradiance of the associated PV module, and so on.

In one embodiment, the protective functions module 612 monitors the voltage magnitude at the AC output. In other embodiments the protective functions module 612 may additionally monitor the signals on each SCMI string. In some instances, the module 612 may disconnect the entire SCMI system or portions of the SCMI system from the grid to isolate the system for repairs or diagnostics. In other instances, the module 612 is configured to deactivate the entirety of, or a portion of the SCMI system upon identifying a fault that may harm the grid or harm the SCMI system. Such "global" faults include over voltage or over frequency conditions on the grid, a grid outage, a surge on the grid, a ground fault and the like. For each of these situations, the entire SCMI system is deactivated and disconnected from the grid to isolate the SCMI system from the grid. Such action provides anti-islanding protection for grid workers during a grid outage.

In addition, the protective functions module 612 may detect a fault (a "local" fault) in a particular SCMI (via data sent from the SCMIs). Upon detection of a local fault, the protective functions module 612 sends a signal to the SCMI local controller to bypass the faulty SCMI. The protective functions module 612 also monitors the number of bypassed SCMIs on each string to ensure that not too many are bypassed. If too many SCMI are being bypassed, the remaining functional units must make up for the lack of voltage not being produced by the bypassed SCMIs. This can lead to additional SCMI failures through operating the SCMIs at dangerous power levels.

The voltage control module 614 is executed to ensure the output voltage of each string matches the grid voltage. The voltage control module 614 controls the phase angle (reactive power generation) of each micro-inverter within the string to cause the sum of real voltage components over the string to sum to the grid voltage. For example, the plurality of output voltages may sum to have a total real component equal to 240 volts, while each individual micro-inverter output may have both real and imaginary components.

Figure 7:
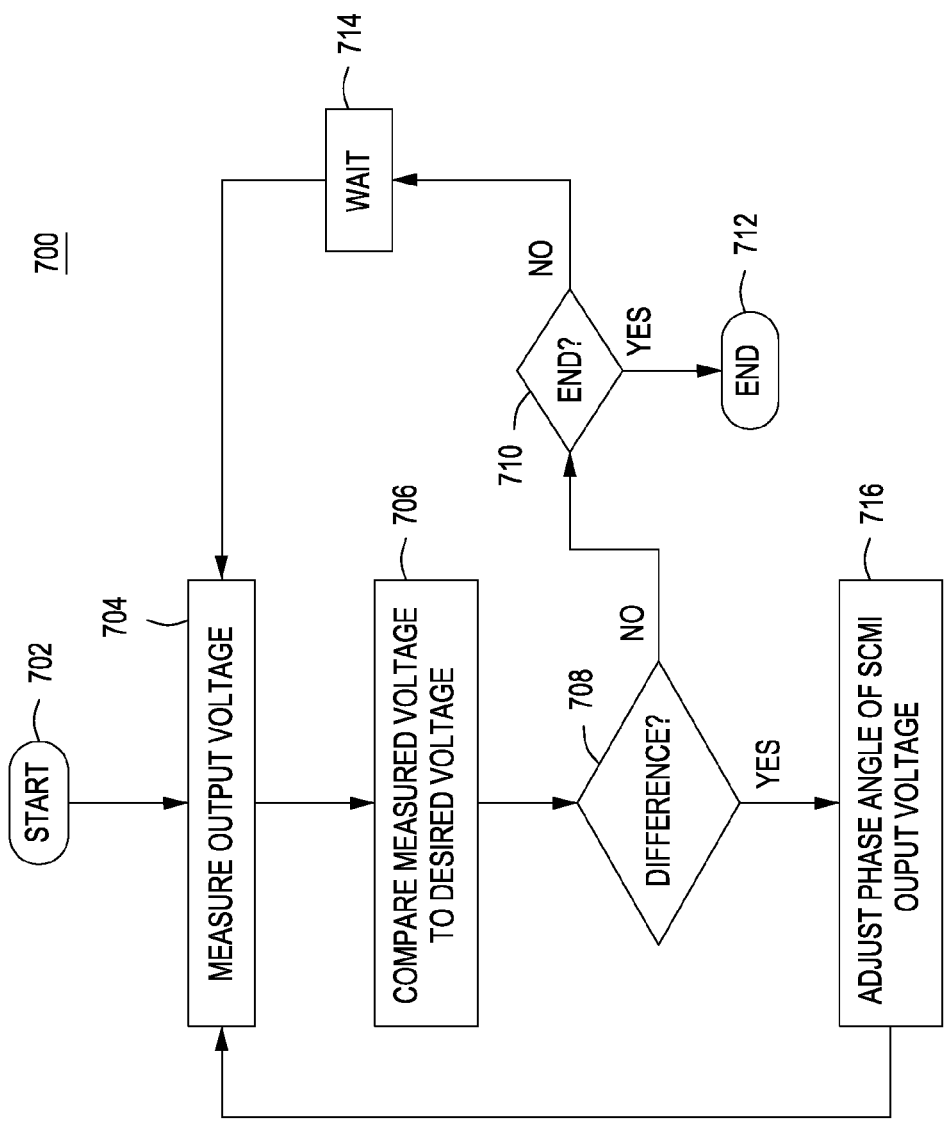
FIG. 7 depicts a flow diagram of a method for providing concertina output voltage control in accordance with one embodiment of the invention.

FIG. 7 depicts a flow diagram of a method 700 of operation of the output voltage control module in accordance with one embodiment of the invention. The method 700 represents one exemplary embodiment of an implementation of the voltage control module of FIG. 6.

The method 700 begins at step 702 and proceeds to step 704 where the method measures the output voltage of each string or at the output of the system. At step 706, the method 700 compares the measured voltage to the desired voltage. The desired voltage is a reference voltage for the output voltage of the system or string, e.g., 120 volts, 220 volts, 240 volts, and the like. The signals being compared may be digital or analog representations of the actual measured signals.

At step 708, the method 700 queries whether there is a difference between the desired voltage and the measured voltage. If a difference does not exist, the method proceeds to step 710 and queries whether the method 700 is to end (e.g., the system is being deactivated). If the query of step 710 is affirmatively answered, the method 700 proceeds to step 712 and ends. Otherwise, the method 700 proceeds to step 714 to wait for a period of time until the next measurement is to be taken, e.g., once per grid cycle. Other sampling rates may be used.

If at step 708 the query is affirmatively answered, the method 700 proceeds to step 716 and adjusts the phase angle of the output of the micro-inverters in each string until the query at step 708 (i.e., determining whether the compared measured voltage is different from the desired voltage) is negatively answered. According to one embodiment, the measured voltage and the desired voltage may be within a predetermined threshold value of each other. As such, an error control loop is established to drive the measured voltage to the desired voltage. Such a control of the phase angle (also known as reactive power control) causes a concertina effect as illustrated in FIG. 8 below.

Figure 8:
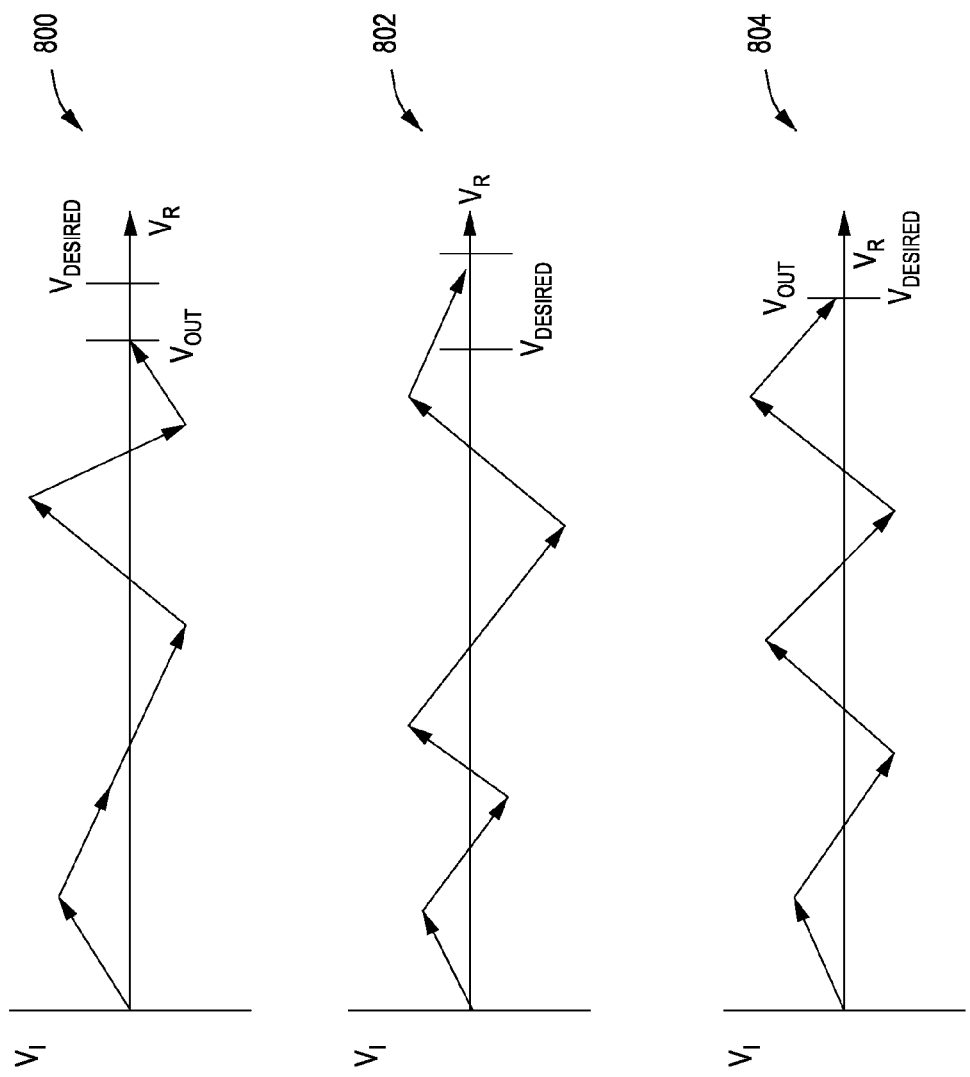
FIG. 8 is a graphical depiction of a plurality of output voltage vectors that are concertina controlled to provide a specific output voltage in accordance with one embodiment of the invention.

FIG. 8 depicts a graphical illustration of the concertina voltage control in accordance with an embodiment of the invention. Graph 800 depicts a first scenario where the measured voltage is less than the desired voltage. Each voltage vector comprises a real component and an imaginary component (e.g., the output of the micro-inverter comprises reactive power). The vectors sum to a particular real value that is less than a desired value.

Graph 802 depicts a second scenario where the vectors sum to a value greater than the desired voltage.

Graph 804 depicts a third scenario where the concertina voltage control algorithm disclosed in the present application has adjusted the phase angles to cause the sum of the voltage vectors to equal the desired voltage. With each cycle, adjustments are made to the output voltage phases of the micro-inverters to achieve the desired real voltage. As the adjustments occur the changes cause a concertina effect across the voltage vectors. In this manner, the micro-inverters are not required to generate only real power and the reactive power component is useful in controlling the output voltage. In SCMI, the current in the string is constant; thus, changes in the power generated by a given micro-inverter are reflected in a change in voltage. Using the reactive power to facilitate voltage control in this manner eases the voltage control parameters. As such, a voltage control algorithm does not have to strictly control the phase angle to zero and control the voltage to achieve the desired voltage. Controlling cumulative phase angle is a simpler process.

While the foregoing is directed to embodiments of the present invention, other and further embodiments of the invention may be devised without departing from the basic scope thereof, and the scope thereof is determined by the claims that follow.

The invention claimed is:

1. A serially connected micro-inverter (SCMI) system comprising:
    a plurality of power sources for producing DC power;
    a plurality of micro-inverters, where each micro-inverter is coupled to at least one power source of the plurality of power sources, for converting the DC power into AC power;
    an AC bus for coupling the plurality of micro-inverters in series to form a string and for coupling the AC power to an AC line, wherein each of the micro-inverters comprises (i) an AC bus coupler for coupling the micro-inverter to the AC bus, wherein the AC bus coupler decouples the micro-inverter from the AC bus when a fault is detected with the micro-inverter, and (ii) a DC to AC inverter for converting DC input power from a coupled power source to AC output power; and
    a controller, coupled to the string, for:
        measuring an output voltage of the string;

comparing the measured output voltage to a desired voltage for the string; and adjusting a phase angle of an output from each micro-inverter in the string until a difference between the measured output voltage and the desired voltage is less than a predetermined threshold value.

2. The SCMI system of claim 1, wherein each of the micro-inverters further comprises:

a current-voltage monitoring circuit for monitoring current and voltage from a corresponding power source; and a maximum power point tracking controller for maintaining maximum power output from the micro-inverter.

3. The SCMI system of claim 2, wherein each of the micro-inverters further comprises:

a local controller that synchronizes phase of an AC output from the micro-inverter and voltage phase of the AC line; and a control bus coupler for receiving information regarding the micro-inverter from the local controller.

4. The SCMI system of claim 3, wherein the local controller further comprises:

an inverter controller for controlling parameters of the DC to AC inverter.

5. The SCMI system of claim 1, wherein each micro-inverter of the plurality of micro-inverters is a voltage source inverter (VSI).

6. The SCMI system of claim 5, wherein the VSI comprises:

an input capacitor;

an H-bridge, coupled to the input capacitor; and a plurality of output inductors to generate an AC output voltage.

7. The SCMI system of claim 1, wherein each micro-inverter of the plurality of micro-inverters is a current source inverter (CSI).

8. The SCMI system of claim 7, wherein the CSI comprises:

a plurality of inductors;

an H-bridge, coupled to the plurality of inductors; and an output capacitor, coupled to the H-Bridge, to generate a pulsed AC current signal.

9. The SCMI system of claim 1 wherein the plurality of power sources comprises a plurality of photovoltaic (PV) modules that generate power when exposed to solar irradiance.

10. The SCMI system of claim 1, wherein the controller is coupled to the Internet for remote monitoring and control.

11. The SCMI system of claim 1, wherein a plurality of strings are coupled in parallel to generate an output power represented by the equation: $P_o(t)=\Sigma_m(i_m(t)\cdot\Sigma_m v_n(t))$ where $P_o(t)$ is the output power generated by the SCMI system, $I_m(t)$ is current in a given string from the plurality of strings and $V_n(t)$ is voltage produced by an individual micro-inverter.

12. The SCMI system of claim 11, wherein power generated by a string is represented $$P(t) = i_m(t) \bullet \sum_n v_n(t)$$

by the equation: where $I_m(t)$ is the current in the string and $V_n(t)$ is the voltage produced by an individual micro-inverter.

13. A method for controlling output voltage of a serially connected micro-inverter system comprising:

measuring an output voltage of a string of series coupled micro-inverters coupled to an AC bus, wherein each of the micro-inverters comprises (i) an AC bus coupler for coupling the micro-inverter to the AC bus, wherein the AC bus coupler decouples the micro-inverter from the AC bus when a fault is detected with the micro-inverter, and (ii) a DC to AC inverter for converting DC input power from a coupled power source to AC output power that is coupled to the AC bus;

comparing the measured output voltage to a desired voltage for the string; and adjusting a phase angle of an output from each micro-inverter in the string until a difference between the measured output voltage and the desired voltage is less than a predetermined threshold value.

14. The method of claim 13 further comprising:

waiting, according to a sampling rate, a period of time until measuring the output voltage again to determine the difference between the measured output voltage and the desired voltage.

15. The method of claim 14, wherein the period of time is once per grid cycle.

16. The method of claim 13, wherein the desired voltage is one of 120 volts, 220 volts, or 240 volts.

17. The method of claim 13, wherein adjusting the phase angle of the output from the string drives a sum of real signal components over the string towards the desired voltage.

* * * * *